United States Patent

Tam

[11] Patent Number: 5,526,403
[45] Date of Patent: Jun. 11, 1996

[54] WIRELINE INTERFACE FOR CELLULAR TELEPHONE

[75] Inventor: Ambrose W.C. Tam, Calgary, Canada

[73] Assignee: Novatel Communications Ltd., Canada

[21] Appl. No.: 394,068

[22] Filed: Feb. 24, 1995

Related U.S. Application Data

[63] Continuation of Ser. No. 4,908, Jan. 19, 1993, abandoned.

[51] Int. Cl.$^6$ ..................................................... H04Q 7/38
[52] U.S. Cl. ........................... 379/59; 455/33.1; 455/33.2; 379/60
[58] Field of Search ................................... 379/58, 59, 61, 379/63, 127, 142, 245, 246, 247, 60; 455/33.1, 54.1, 89, 54.2, 33.2

[56] References Cited

U.S. PATENT DOCUMENTS

| | | | |
|---|---|---|---|
| 4,658,096 | 4/1987 | West, Jr. et al. | 379/58 |
| 4,737,975 | 4/1988 | Shaefer | 379/58 |
| 4,775,997 | 10/1988 | West, Jr. et al. | 379/58 |
| 4,924,496 | 5/1990 | Figa et al. | 379/142 |
| 4,959,851 | 9/1990 | Tobolski, Jr. et al. | 379/59 |
| 4,972,457 | 11/1990 | O'Sullivan | 379/59 |
| 4,989,230 | 1/1991 | Gillig et al. | 379/59 |
| 4,991,197 | 2/1991 | Morris | 379/63 |
| 5,008,925 | 4/1991 | Pireh | 379/60 |
| 5,048,073 | 9/1991 | Weiser et al. | 379/61 |
| 5,218,628 | 6/1993 | Ito | 379/58 |
| 5,260,988 | 11/1993 | Schellinger et al. | 379/59 |
| 5,353,331 | 10/1994 | Emery et al. | 379/58 |

Primary Examiner—Curtis Kuntz
Assistant Examiner—William G. Trost
Attorney, Agent, or Firm—Cesari and Mckenna

[57] ABSTRACT

A wireline interface permitting a cellular telephone transceiver to originate and receive calls using both cellular and wireline services. The invention permits a subscriber unit to operate as a standard cellular telephone when it is disconnected from a land-based telephone line, and as both a full-featured telephone and a full-featured cellular telephone when it is connected to a wireline. A wireline interface circuit provides on/off hook, calling identification, and audio signal conversion functions on the wireline signals. A duplexed audio switch permits the audio signals provided to and from a cellular-type handset to be connected either to the cellular transceiver or to the wireline interface adapter, under control of the user. As a result, any handset-provided functions such as speed dialing or hands-free operation are available for use when operating on a wireline circuit as well as when operating on a cellular radio link. Call waiting is implemented between the cellular and wireline interfaces, so that the user may hold a wireline call when a cellular call is incoming, as vice versa. With automatic or semi-automatic call forwarding of the cellular line, permits the user to be accessed through a personal telephone number, regardless of whether the unit is in cellular or wireline mode. In addition, any calling identification information made available during a wireline call may be provided to a display on the handset.

18 Claims, 12 Drawing Sheets

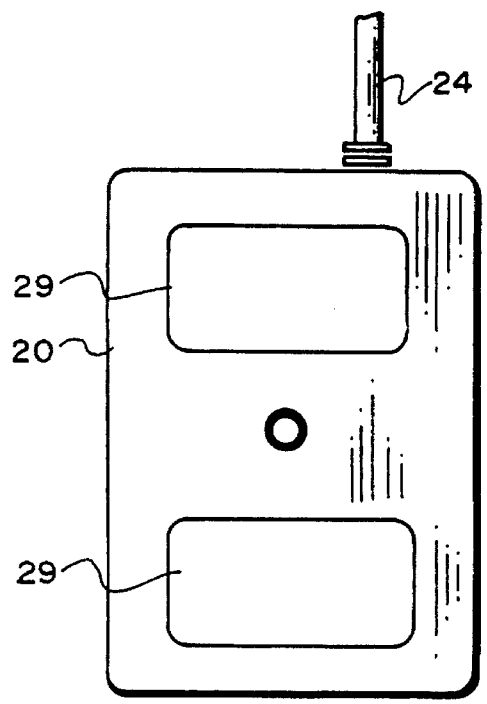 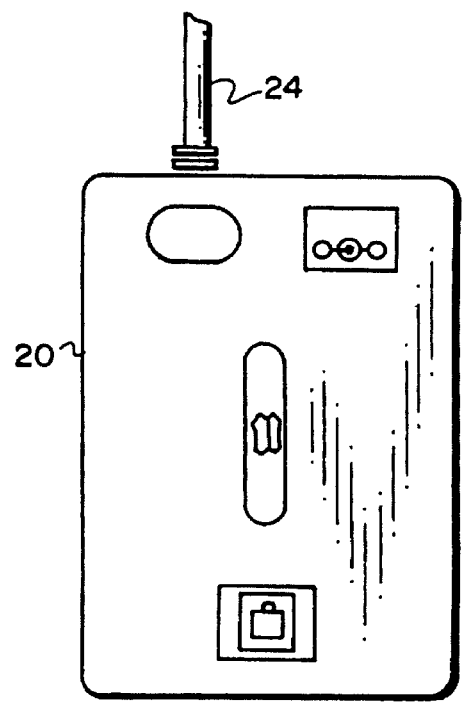
FIG. 2A   FIG. 2B
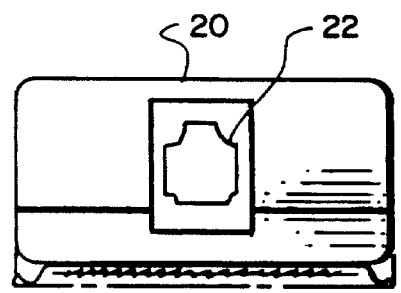
FIG. 2C

WIRELINE INTERFACE FOR CELLULAR TELEPHONE

This is a continuation of Ser. No. 08/004,908, filed Jan. 19, 1993, now abandoned.

FIELD OF THE INVENTION

This invention relates generally to cellular telephones and more specifically to a wireline interface that permits a cellular telephone subscriber unit to operate over a land-based telephone line as well as the cellular radio network.

BACKGROUND OF THE INVENTION

With today's standard telephone communications services, no one service provides all of the personal communication capabilities desired by a typical telephone subscriber. In general, certain features which are available when using higher-cost services, such as a cellular service, are not available when using lower cost services, such as the landline public switched telephone network (PSTN).

For example, a standard cellular telephone subscriber unit (cellular phone) provides features such as speed dialing, speaker phone (hands-free), and an alpha-numeric display. However, such features are not commonly available on a standard landline telephone.

The situation has even developed to a point where the add-on features available to the users of a low-cost service may not be available to the users of a higher-cost service. For example, a landline subscriber can purchase services such as incoming caller identification (calling ID), but no provision is typically made to provide such calling ID services over the cellular network.

Furthermore, each service now typically requires its own service-specific subscriber device or terminal. That is to say, a landline call cannot be placed using a standard cellular subscriber unit, and a cellular call cannot be placed using a standard landline subscriber unit. Thus, in order to obtain all available telephone features, a person must not only subscribe to more than one service, but must also buy, install, and maintain multiple subscriber units.

Even if a cellular and landline telephone are both installed, the subscriber still must typically give out two or more telephone numbers if he wishes to be reached at all times, when on the road, at home, and in the office. Otherwise, without having arranged for one or more of the numbers to be call-forwarded in advance, a call made to one phone will not be received if the subscriber is physically distant from the subscriber equipment assigned to the called number.

In addition, the subscriber's personal information, such as speed-dialing information, must be programmed into all the subscriber units he uses for each service, and must be reprogrammed each time the information changes.

There are central-office systems being proposed for use in North America and Europe which will implement so-called personal communications services, making it possible to reach any given individual using a single telephone number, regardless of what type of subscriber is available at a given point in time. However, such systems are not currently planned to be implemented commercially until the mid-1990's at the earliest.

U.S. Pat. No. 4,989,230 issued to Gillig et al. and assigned to Motorola, Inc., discloses a cellular cordless telephone which operates with both a standard cordless base unit as well as a standard cellular base station. This device permits the user to connect to the telephone company central office either through the standard cordless telephone or through the cellular system. However, because this device merely combines the features of both devices, it exhibits the shortcomings of existing cellular and residential landline services.

SUMMARY OF THE INVENTION

Accordingly, it is among the objects of this invention to provide a landline interface for a cellular telephone transceiver that permits the use of a single subscriber device to originate and receive calls over both cellular and landline services.

The invention should allow a user to initiate a call or to be accessed through a single, "personal" telephone number, regardless of whether the user is currently available through the cellular or landline network.

In addition, the invention should accomplish this with a single subscriber device that has all-user specific personal information contained therein, and which can be used to access both the cellular and landline networks.

Briefly, an apparatus constructed in accordance with the invention includes a cellular transceiver, a handset, a landline interface adapter and a duplexed audio switch. The landline interface adapter accepts the standard tip and ring signals from a landline telephone and provides wireline audio signals in four-wire format. The duplexed audio switch is disposed between the cellular transceiver, the cellular handset, and the wireline interface, to selectively connect either the wireline audio signals or the cellular audio signals to the handset.

In operation, when the unit is disconnected from a land-based telephone line (wireline), it operates as a standard cellular telephone, by positioning the audio switch so that the cellular audio signals are connected to the handset. However, when a wireline is available, the user may choose to connect the landline audio signals to the cellular handset.

The subscriber can thus send and receive calls either via the cellular or landline link, which ever fits his need at a given instant, using the same subscriber unit.

The subscriber's personal information, such as speed-dial numbers, need only be input into the single device, and are available via the handset for both cellular as well as landline calls. Other handset features, such as the handsfree audio circuits, typically associated only with standard cellular telephones, may also be used during landline calls, since the audio switch is located between the handset and the transceiver.

Calling identification, if available from the provider of the local landline service, can also be detected by the landline interface. If this is done, the calling ID information may be displayed on the handset. Any 'store caller ID' functions performed during a landline call can then also be used to originate later cellular or landline calls.

The user may also elect to automatically forward cellular calls to the landline service when the landline service is available.

Finally, since the user has two telephone lines available, call waiting features may be provided within the subscriber unit, by allowing incoming calls on one line when the other line is busy, and suitably prompting the user.

BRIEF DESCRIPTION OF THE DRAWINGS

The above and further advantages of the invention may be better understood by referring to the following description in conjunction with the accompanying drawings, in which:

FIGS. 2A, 2B, and 2C are detailed bottom, top, and end views of the exterior case of the wireline interface 20;

DESCRIPTION OF ILLUSTRATIVE EMBODIMENTS

Figure 1:
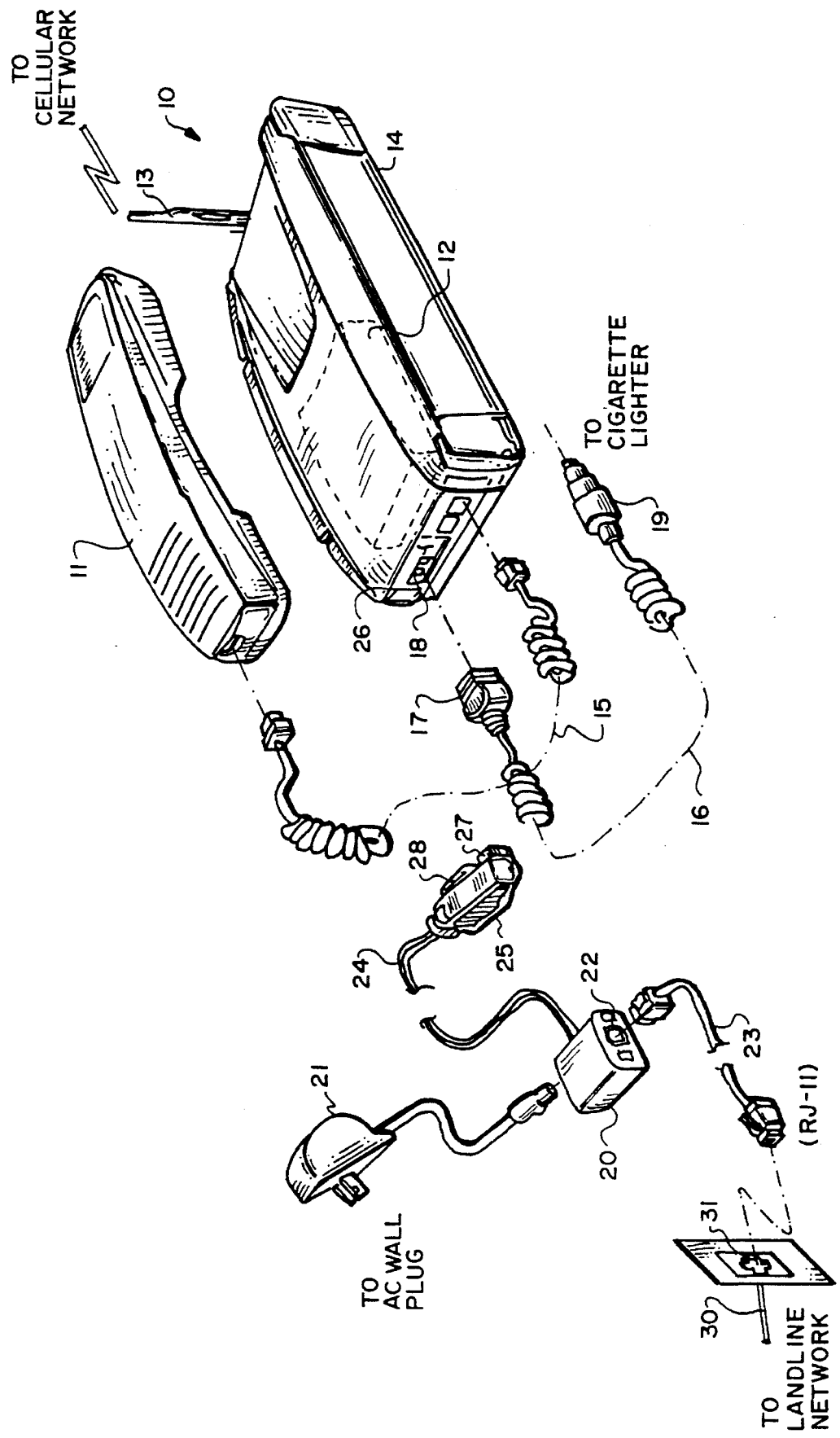
FIG. 1 is a perspective view of a wireline interface 20 according to the invention, and how it is used to connect a transportable cellular telephone 10 to a land-based wire telephone line 30.

FIG. 1 shows a wireline interface 20 for connecting a cellular telephone 10 to the land-based public switched telephone network via a wireline 30 while at the same time allowing the use of the cellular telephone 10 to receive and place calls over the cellular telephone network via an antenna 13.

The cellular telephone 10 consists of a handset 11, a transceiver 12, and the antenna 13. The illustrated cellular telephone 10 is of the transportable type, and thus the transceiver 12 and antenna 13 are placed within a cradle 14 which typically adapted for receiving the handset 11. The handset 11 of the transportable cellular telephone 10 is typically connected to the transceiver 12 via a coil cord 15.

However, the handset 11 may also be of the cordless radio-telephone type, in which case the handset 11 is connected to the transceiver 12 via an appropriate radio frequency link instead of the coil cord 15.

It should also be understood that the cellular telephone 10 may be of the portable type, in which case the transceiver 12 and antenna 13 are integral with the handset 11 (not shown in FIG. 1), in which case, a coil cord or radio link is unnecessary.

Electrical power is provided to the cellular telephone 10 via a power cord 16 containing a power plug 17 that mates with a power connector 18 on the cradle 14. The illustrated power cord 16 contains a cigarette lighter adapter 19 for providing direct current (DC) power to the cellular telephone 10 through a standard automobile cigarette lighter; other types of DC adapters can be used as well.

The wireline interface 20 includes an AC adapter 21 and a jack 22 for accepting a wireline telephone connector cable 23 to connect the wireline interface 20 to the wireline 30 via a standard RJ-11 telephone jack 31.

A pigtail plug 25 is connected to the wireline interface 20 via a multi-wire bus cable 24. The pigtail plug 25 consists of a power plug 27, which mates with the power connector 18 previously described, as well as a data signal plug 28, which mates with a data signal connector 26 on the cellular telephone 10, to provide a data signal bus 24 between the transceiver 12 and wireline interface 20. The power plug 27 provides and alternative current (AC) line voltage thereby permitting the battery (not shown) to be trickle-charged through the wireline interface 20. However, more importantly, the data signal plug 28 serves to provide a connection for audio signals between the cellular telephone 10 and the wireline 30.

Although shown as a separate unit in FIG. 1, the wireline interface 20 may be integrated with the cellular transceiver 12 within the cradle 14, thereby eliminating the need for the cable 24 and pigtail plug 25.

FIGS. 2A through 2C are dose-up views of the external case of the wireline interface 20 of FIG. 1, with FIG. 2A being a bottom view, FIG. 2B a top view, and FIG. 2C an end view. The bus cable 24 is partially viewable in FIGS. 2A and 2B; the RJ-11 jack 22 can be seen in FIG. 2C. The bottom of the wireline interface 20 is preferably formed with indentations 29 for accepting mechanical fasteners such as Velcro strips or the like to enable the wire line interface 20 to be conveniently mounted on a wall near the standard RJ-11 jack 31. (Velcro is a trademark of the Velcro Corporation of Manchester, N.H.)

Figure 3:
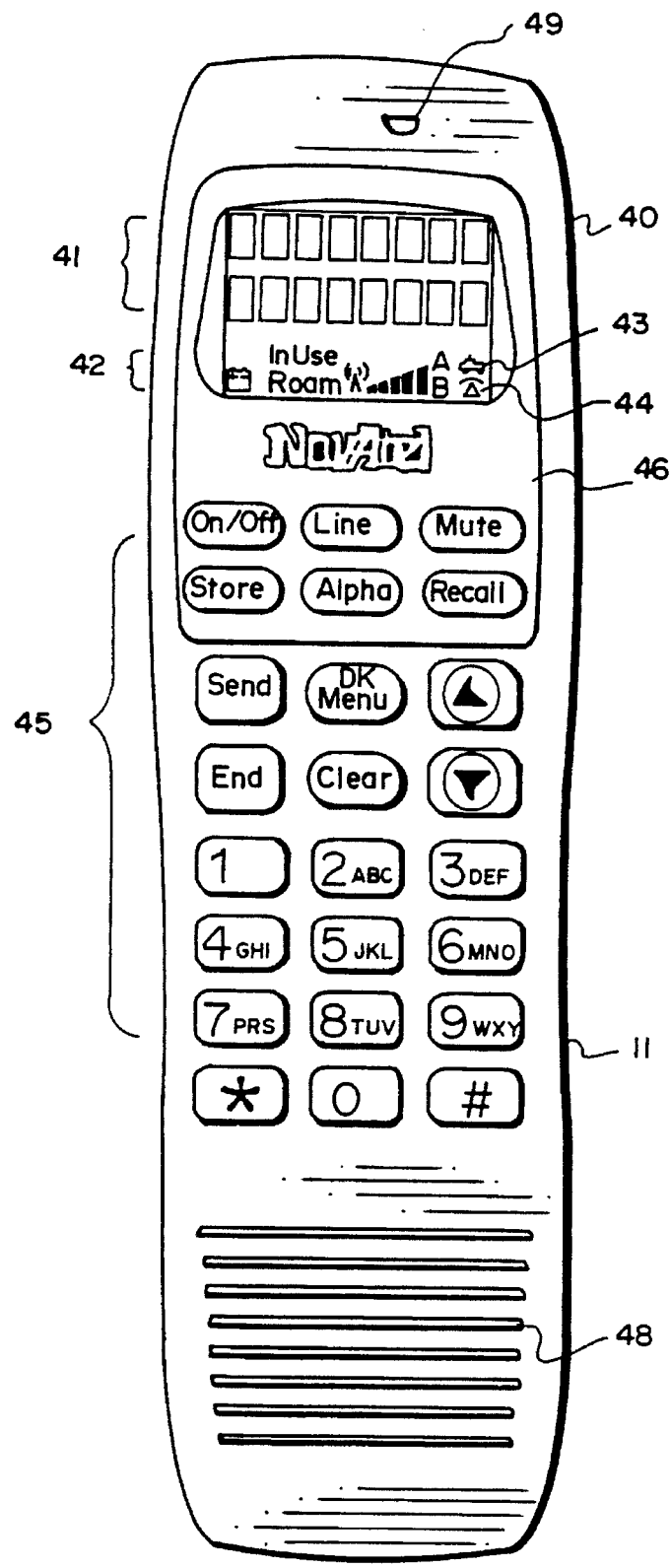
FIG. 3 is a detailed view of the handset 11 of the cellular telephone 10.

FIG. 3 is a dose-up view of the top of the handset 11, including a display 40 and keypad 45. The display 40 has a conventional alphanumeric area 41 as well as graphic icons or prompts 42. In accordance with the invention, some of the graphic icons 42 are used to indicate whether the present call is a cellular call, such as the icon 43, or a wireline call, such as the icon 44.

In addition to the standard keys on the keypad 45, the handset 11 also includes a key 46, labelled "LINE", which is used to select between wireline and cellular operation. The "LINE" key 46 is also used in other ways, as will be described in detail below.

As is conventional, the handset 11 also includes a speaker 48 and microphone 49 for supporting hands-free operation while the handset 11 is placed within the cradle 14 (FIG. 1).

Figure 4:
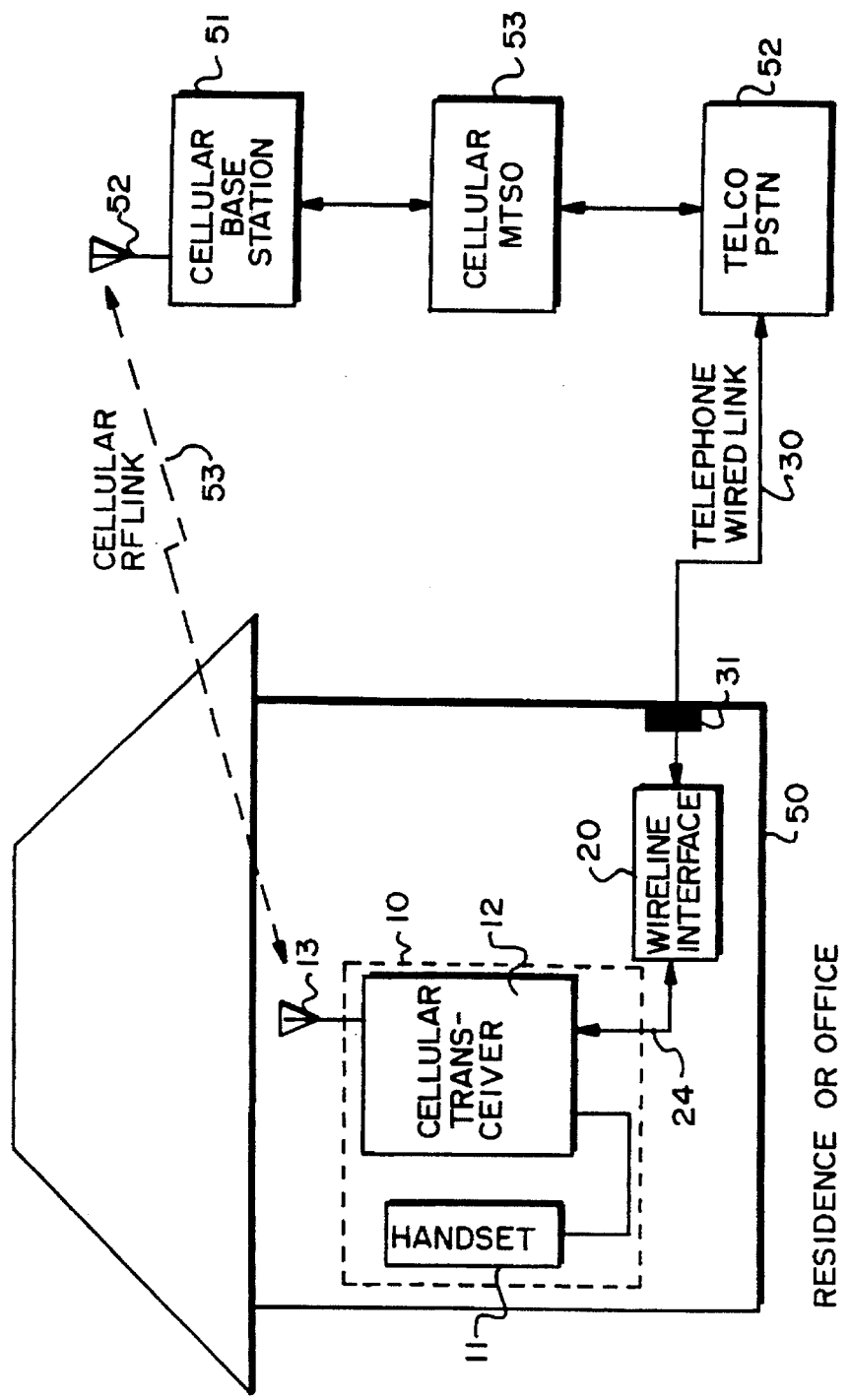
FIG. 4 is a system block diagram showing how the wireline interface 20 permits the cellular telephone 10 to place calls to a telephone company central office via a wireline 30 or via a cellular radio frequency link 53.

FIG. 4 is a system block diagram showing the cellular telephone 10, including the handset 11, transceiver 12, as well as the antenna 13 forming a standard cellular telephone 10. As for conventional cellular telephones, the cellular telephone 10 communicates with a cellular base station 51 and base station antenna 52 via a standard cellular radio frequency link 53.

However, according to the invention, cellular telephone 10 also has its transceiver 12 connected to the wireline interface 20 over the data signal bus 24. In turn, the wireline interface 20 is also connected, via a standard wireline telephone terminal 31, to the public switched telephone network 52 provided by a local telephone company. The cellular base station 51 is also connected to the telephone company network 52, in a conventional manner, through a mobile telecommunications switching office 53.

The transceiver 12, by responding either to commands from the user via the handset 11, or to a sequence of incoming calls, switches either the cellular or wireline system to the handset 11. Hence, the integrated telephone system provided by the cellular telephone 10 and wireline interface 20 can communicate with other subscriber terminals through either the cellular system or the land-based system.

When the wireline interface 20 is installed in a residence or office 50, the user can operate the cellular phone 10 as a full-featured wireline telephone, and enjoy the benefit of low-cost wireline service charges. However, when the user wishes to take the cellular telephone 10 on the road, the wireline interface 20 is quickly disconnected and the telephone 10 automatically switches to operate as a conventional cellular telephone.

Figure 5:
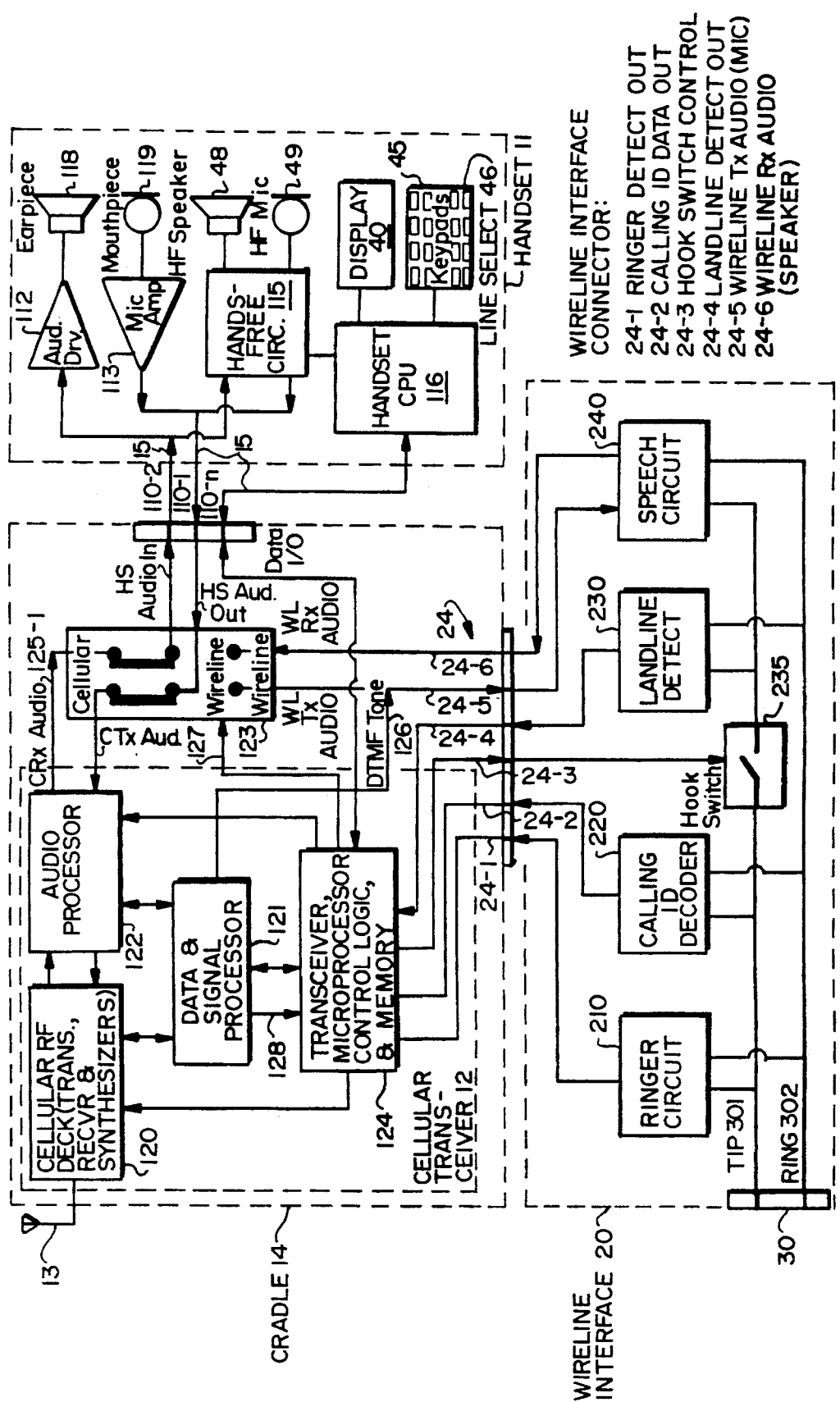
FIG. 5 is a detailed block diagram of the handset 11, transceiver 12, and wireline adapter 20.
Figure 6A:
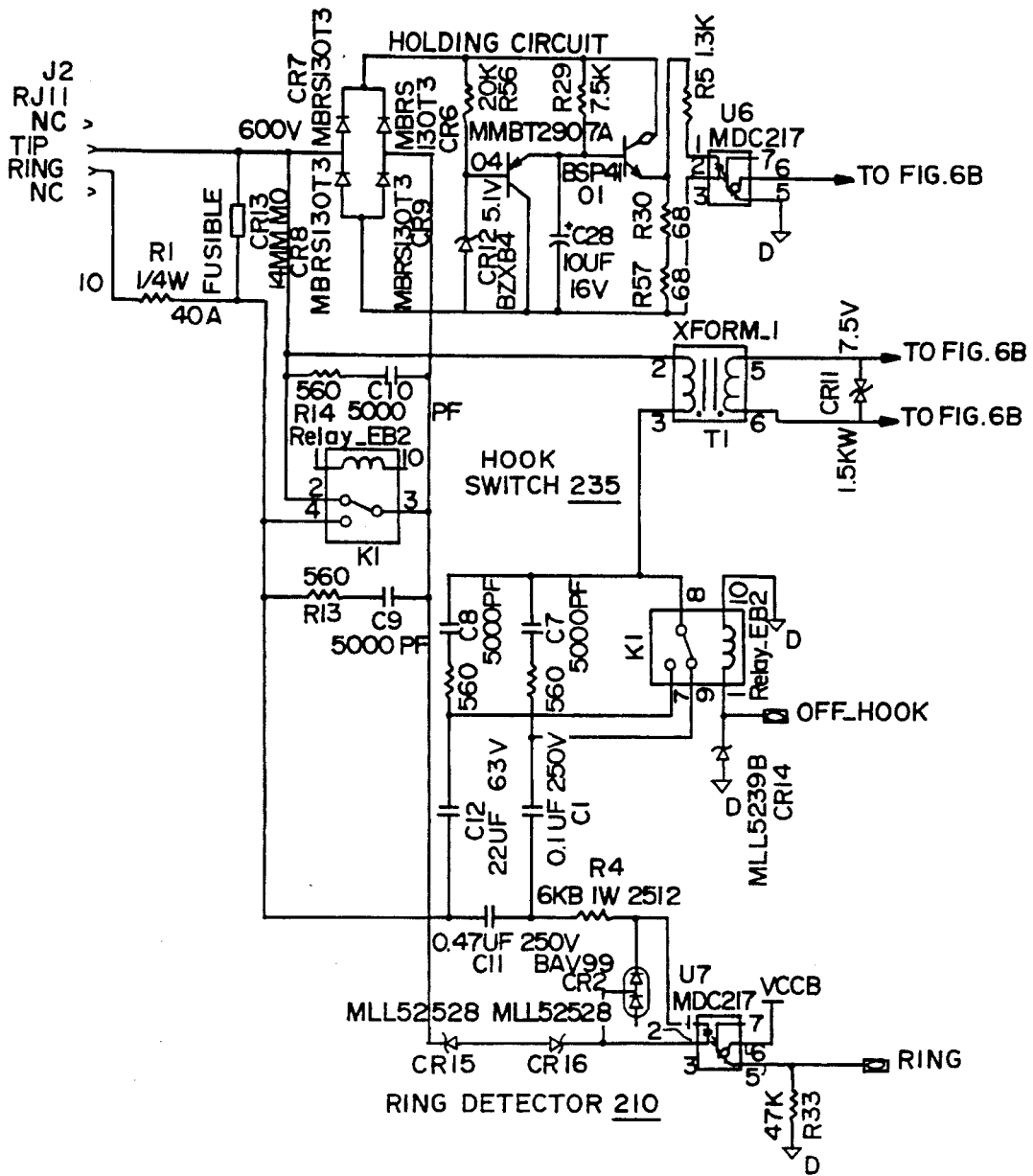
FIG. 6 is a detailed schematic diagram of the wireline adapter 20.
Figure 6A:
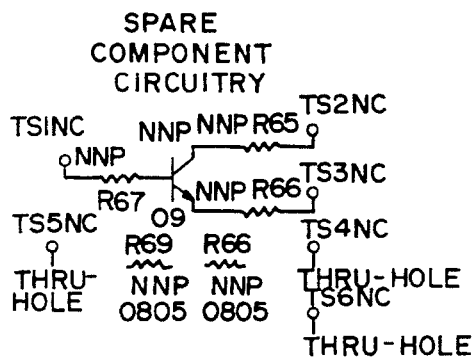
Figure 6B:
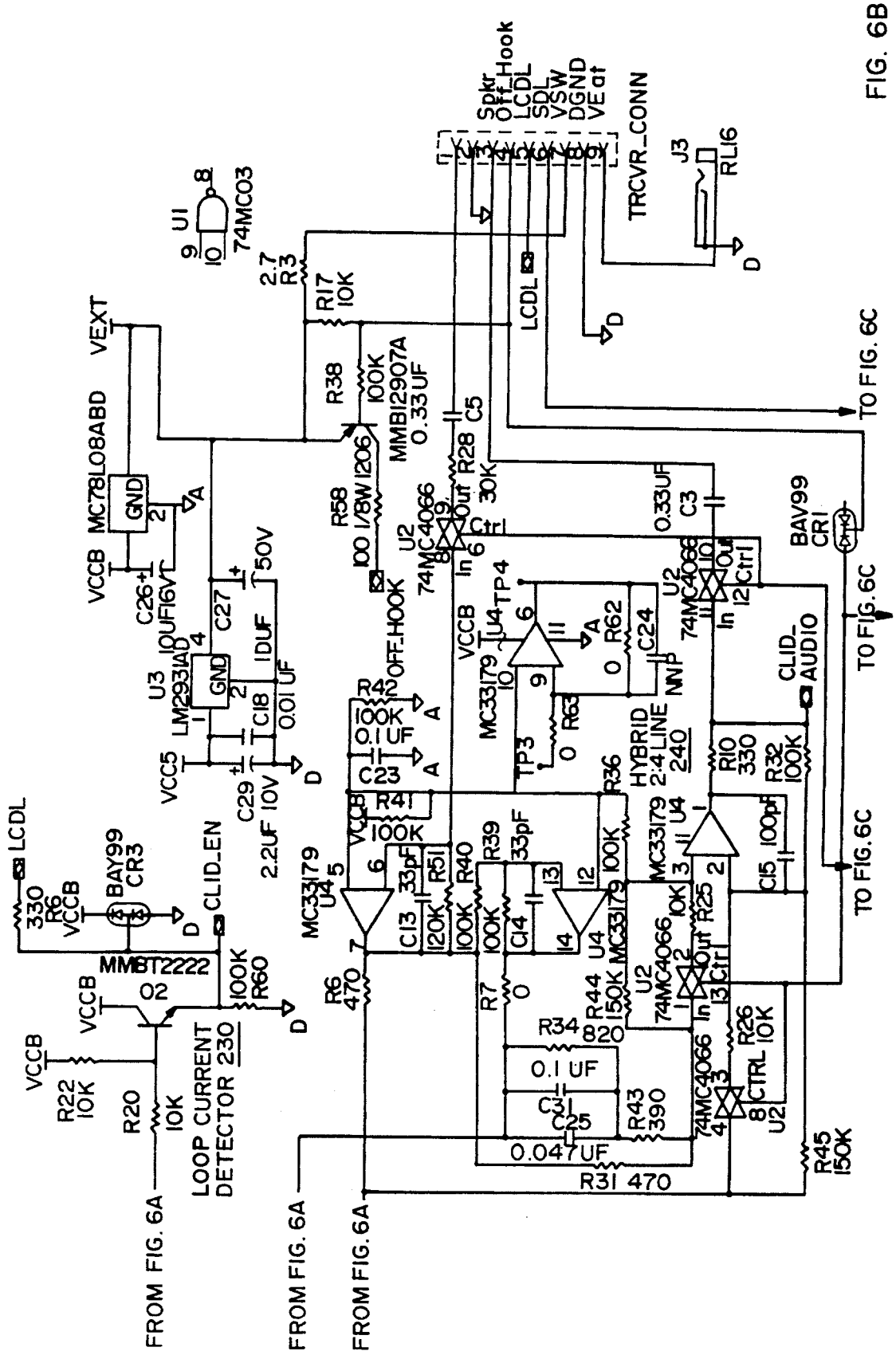
Figure 6C:
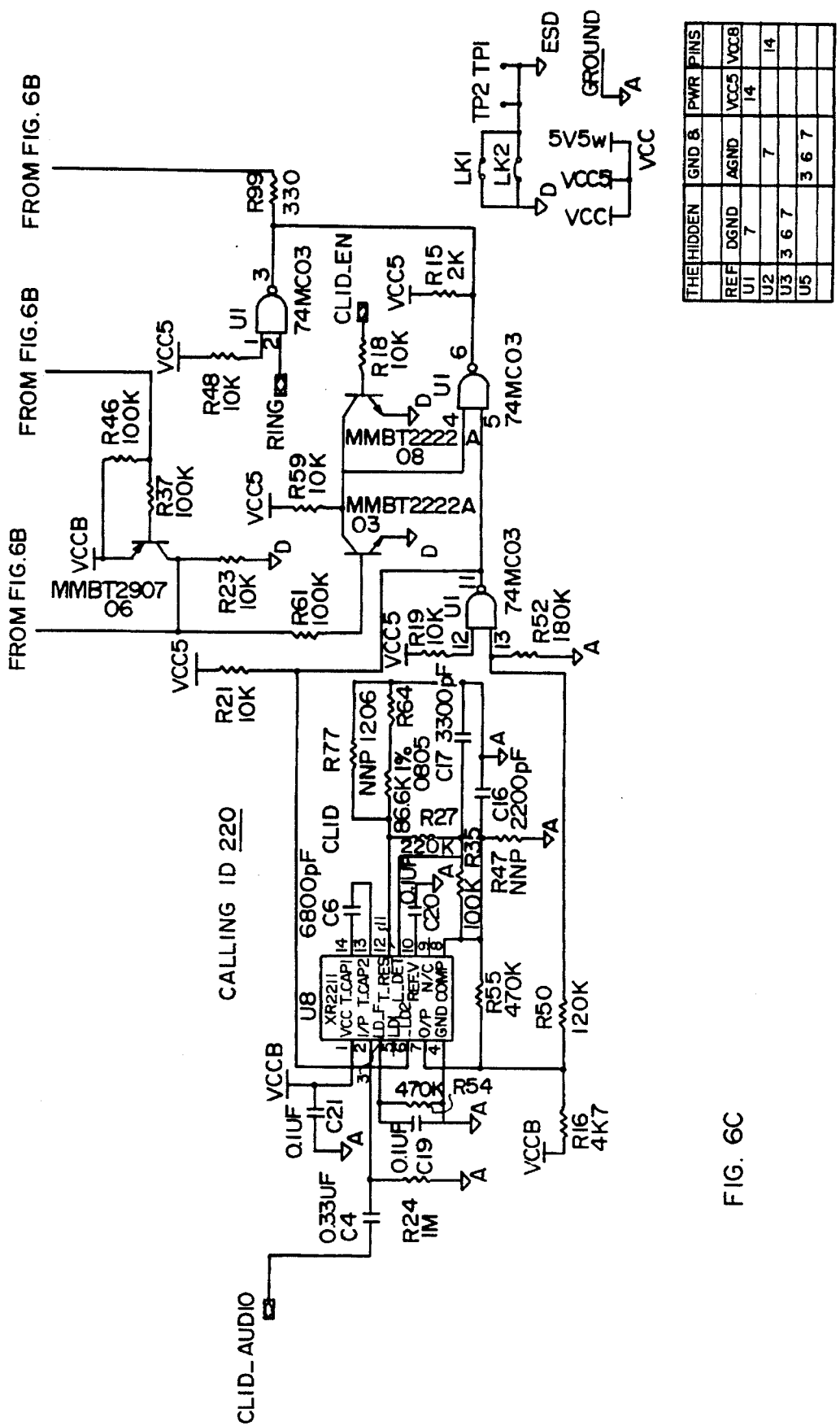

FIG. 5 is a schematic block diagram for the handset 11, cellular transceiver 12, wireline interface module 20, and an audio switch 123 disposed between the transceiver 12, wireline interface 20, and handset 11. The audio switch 123 connects the handset 11 either to the wireline interface 20 or to cellular transceiver 12, depending upon a number of conditions, as described in detail in connection with FIG. 7.

The handset 11 consists of the usual acoustic transducers, including an earpiece 118, a mouthpiece 119, a hands-free speaker 48 and a hands-free microphone 49 (previously shown in FIG. 3). The handset 11 also includes a display 40 and keypads 45 (as previously shown in FIG. 3). A conventional audio driver 112, microphone amplifier 113, hands-free circuit 115, and a handset central processor 116 are included in the handset 11 as well, to process the handset audio in 11-1 and handset audio out 11-2 signals.

The transceiver 12 includes a cellular radio frequency (RF) deck 120, a data and signal processor 121, an audio processor 122, and a microprocessor 124.

The RF deck 120, data and signal processor 121, and audio processor 122 operate in a conventional, known fashion to provide duplexed receive and transmit cellular audio signals, 125-1 and 125-2.

In addition, dual tone multi-frequency (DTMF) digit tones are generated by a tone generator circuit in the data and signal processor 121, and provided on a DTMF tone line 126.

The interface between the handset 11 and transceiver 12 includes a handset audio-in signal 110-1, a handset audio-out signal 110-2, as well as one or more data input/output signals 110-n. The handset processor 116 may communicate with the transceiver processor 124 via the data I/O lines 110-n, to pass information such as which keys 45 have been pressed, or to present information to the display 40.

The wireline interface 20 consists of several circuits including a ring signal detector 210, a calling ID decoder 220, a wireline detector, hook switch 235, and a speech circuit 240.

In particular, the wireline detect circuit 230 provides an indication to the transceiver processor 124 that the wireline interface 20 is properly connected to the transceiver 12 and that there is an operating wireline 30 being provided by the local telephone company service. This is done by checking for the presence of loopback current in the tip 301 and ring 302 leads.

The ring signal detect circuit 210 is a conventional ring signal detector that is designed to detect an incoming ringing signal on the tip 301 and ring 302 signals, on the wireline 30. When an incoming ringing signal is detected, the ring detect output signal logic line 24-1 is asserted to a logic true state, thereby indicating to the transceiver microprocessor 124 that an incoming ringing signal has been detected. This, in turn, typically causes the transceiver microprocessor 124 to instruct the audio processor 122 to generate an alert tone on the audio out signal 110-2, as well as other actions, as described below.

The calling identification decoder 220 is also implemented conventionally, typically using a phase-lock loop to recover the encoded frequency shift key (FSK) calling identification data provided on the incoming wireline 30. The decoded data message is provided to the transceiver microprocessor 124 via the calling ID data output line 24-2. Calling ID data may then be provided to the alphanumeric display 40 by the processor 124 first sending it to the handset CPU 116 via the data input/output signals 110-n.

The speech circuit 240 includes at least a hybrid 2:4 line converter 240 that converts the two-wire, tip and ring audio signals required for the wireline 30 to the four-wire signals required by the handset 11, and vice versa. Mute and side-tone suppression circuits may also be included as part of the speech circuit 240, which can be controlled by the transceiver 12 via the bus 24 in various modes of operation.

The hook switch circuit 235 permits the processor 124 to control the on/off hook functions of wireline calls. The hook switch signal 24-3 is also preferably DC-biased, which can be used as an indication that the transceiver 112 is properly connected to the wireline interface 20.

A more detailed circuit diagram of the wireline interface 20 is provided in FIG. 6.

Returning to FIG. 5, the bus 24 carried over the data signal plug 28 (FIG. 1) between the transceiver 12 and wireline interface 20 thus includes the ring detect output signal 24-1, calling ID data output signal 24-2, hook switch signal 24-3, wireline detect signal 24-4, wireline transmit audio signal 24-5 and wireline receive audio signal 24-6.

As mentioned previously, according to the invention, an audio switch 123 is also included between the transceiver 12, wireline interface 20, and handset 11. The audio switch 123 connects the handset audio signals 110-1 and 110-2 either to the wireline audio signals 24-5 and 24-6, or to the cellular audio signals 125-1 and 125-2. The selection of which audio signals are connected to the handset 11 is via the switch control signal 127 from the transceiver microprocessor 124. The circumstances dictating which particular connection is enabled at any given time is described in detail in connection with FIG. 7.

Because the audio signal selection is handled by the audio switch 123 within the transceiver 112, all of the functions of the handset 11, including the hands-free circuit 115 and hands-free speaker 48, and hands-free microphone 49, may be used for both cellular and wireline calls.

As to the operation of the transceiver microprocessor 124 for incoming calls, it automatically senses whether an incoming call is a cellular or wireline call, and switches the audio switch 123 to the appropriate position. For example, when an incoming cellular call is made to the cellular RF deck 120, this is detected by the data and signal processor 121, which, in turn, signals the transceiver microprocessor 124 by asserting a cellular incoming detect signal 128. This, in turn, causes the processor 124 to insure that the handset 11 is connected to the cellular audio signals 125-1 and 125-2, by positioning the switch 123 in the illustrated position. The incoming cellular call is then processed by the transceiver 12 in the conventional fashion.

When an incoming landline call provides a ringing signal on the tip and ring leads 301 and 302, this is detected by the ring detect circuit 210, and the ring detect signal 24-1 is asserted. This causes the transceiver microprocessor 124 to monitor the caller ID output signal 28-2 for any calling party ID information, and then flip the switch 123 to connect the landline audio signals to the handset 11. Then, typically, the transceiver microprocessor 124 turns on the electronic hook switch 235, by lowering the hook switch line 28-4, and the landline call proceeds normally.

For outgoing calls, the user is permitted to toggle between the two systems, such as via the handset "LINE" button 46, with verification via the display icons 43 and 44. The selection of the desired outgoing system is then communicated to the transceiver 12, via the handset CPU, to the transceiver microprocessor 124, which again selects the appropriate position for the audio switch 123. The transceiver 124 also typically provides distinct ringing tone, display messages and icons giving clear indications via the display 40 for the particular telephone system that the user is currently operating.

During an outgoing landline call, the transceiver 12 may pulse the hook switch control signal 28-4 for pulse tone dialing, or raise the hook switch and cause the data and signal processor 121 to generate dual tone multi-frequency digits, which are sent to the wireline 30 via the DTMF tone wire 126 and speech circuit 240.

Figure 7A:
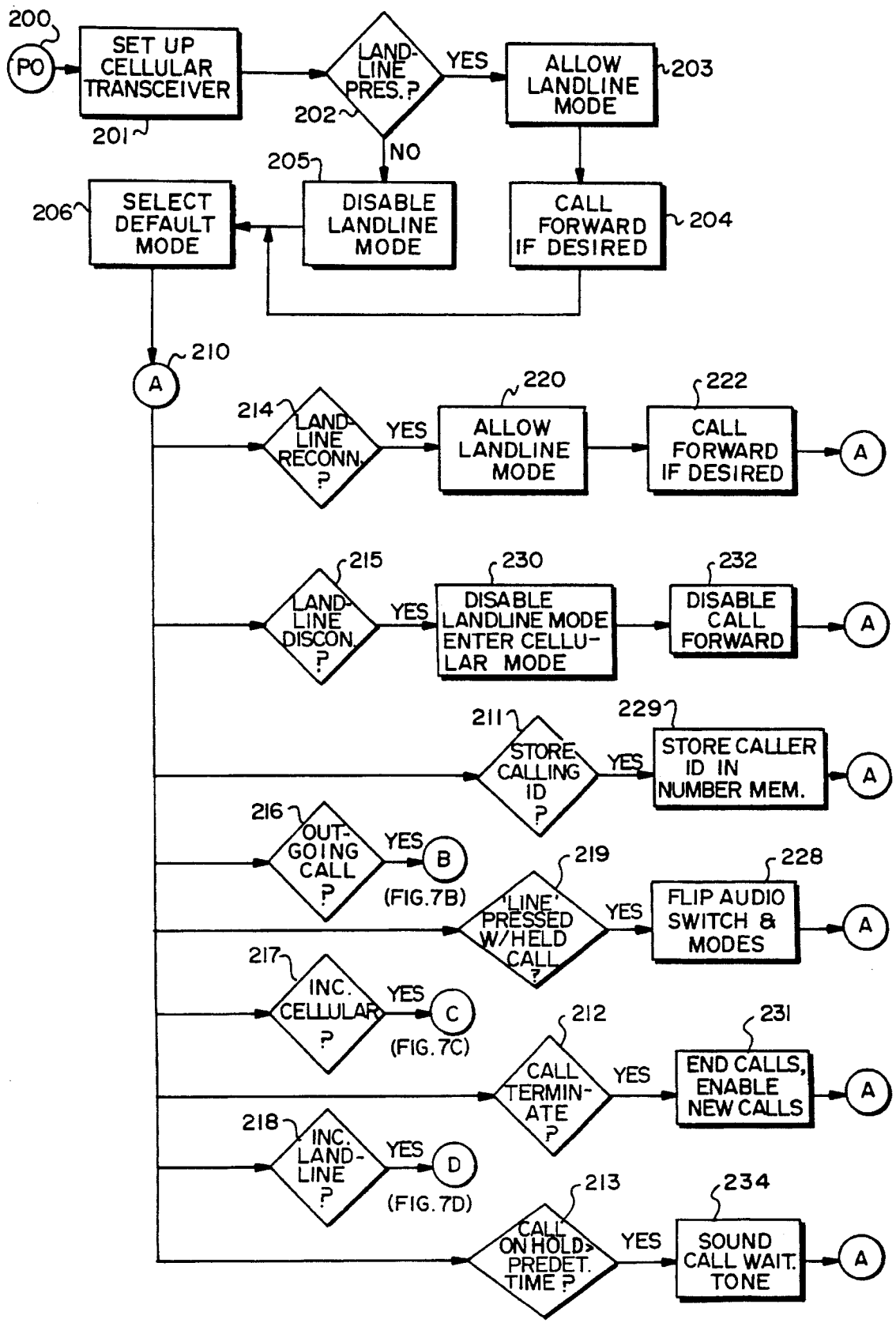
FIGS. 7A through 7D are flowcharts of certain steps performed by the transceiver microprocessor 124.

A detailed example of how the transceiver microprocessor 124 may be programmed to provide these and other functions is shown in the flowcharts of 7A–7D. Turning attention to FIG. 7A, from an initial power-on step 200, the processor 124 performs a standard cellular transceiver set-up routine in step 201. Next, in step 202, the processor determines if a wireline connection is present, by checking the logic state of the wireline detect output signal 24-4. If this signal is in a logic true state, then step 203 is next executed. In step 203, the processor 124 sets a flag (such as a register bit or memory location) indicating that wireline mode is allowed.

Following that, in step 204, call forwarding is enabled if desired. In particular, call forwarding may be set up by the user to automatically occur whenever a wireline 30 is connected, or may be set up through user prompting on the display 40 and keypad 45. If indeed, call forwarding is to be set, the transceiver 12 then performs the required steps to enable the call forward service. In some cellular systems, for example, this is accomplished by sending a "*72" to the cellular base station 51. When call forwarding is enabled, any incoming calls attempted to the cellular telephone 10 over the cellular network will be automatically forwarded to the wireline 30, through the telephone central office 52 (FIG. 1), thereby preventing the expensive cellular service charges from being incurred.

If, however, in step 202, there is no wireline 30 available, control passes to step 205 where a flag is set to indicate that the wireline mode is not available.

In either event, step 206 is next processed. In step 206, the processor 124 enters a default mode, either cellular mode or wireline mode. The default mode may be set, for example, to always be the wireline mode when a wireline 30 is available. However, the processor 124 may also be programmed to remember the last mode of operation, and to select that as the default mode. Of course, in either event, the default mode will not be selected as the wireline mode if step 202 indicated that a wireline 30 was not available.

Upon entering the chosen mode in step 206, the audio switch 123 is flipped to the appropriate position, and the associated icon on the display 40 is energized.

When entering cellular mode, for example, the processor causes the switch 123 to be set to connect the handset audio signals 110-1 and 110-2 to the cellular audio signals 125-1 and 125-2. The cellular icon 43 is energized on the display 40. The processor 124 then performs any other cellular-mode specific tasks.

Similarly, upon entering the wireline mode, the audio switch 123 is flipped to connect the handset audio signals 110-1 and 110-2 to the wireline audio signals 24-5 and 24-6.

The processor then reaches an idle state "A" in step 212. The idle state permits interrupts while other processing, such as standard call processing, is taking place. Such interrupting events may include the re-connecting of the wireline 30 to the transceiver 12, in step 214, disconnecting the wireline 30 in step 215, the user originating an outgoing call through step 216, the unit receiving an incoming cellular call in step 217, the user receiving an incoming wireline call in step 218, the user pressing the "LINE" key when a call is on hold in step 219, the user wanting to store a calling ID, in step 211, a call being terminated in step 212, or if a call has been on hold for more than a predetermined time, in step 213.

When the wireline 30 is re-connected, such as when the processor 124 detects that the state of the wireline detect signal 24-4 is again true, control is passed from step 214 to step 220, where the microprocessor 124 sets the flag indicating that wireline calls are allowed. Next, in step 222, call forwarding is enabled, if desired, as previously explained.

In the event that the wireline 30 is disconnected, as detected when the wireline state signal 24-4 becomes false, control passes to step 230. Here, wireline calls are subsequently disabled by the microprocessor 124, and the unit switches modes and continues operation in the cellular mode.

The next step, step 232, sends a disable call forward sequence if call forwarding had been previously enabled. This may be a "* 73" sequence in some cellular systems, for example. Automatic call forward disabling at this point can also either be pre-selected by the user, or the user can be prompted each time the wireline is disconnected, whichever is desired.

If the user indicates via the keypad 45 that the ID for the presently calling party is to be stored, control passes from step 211 to step 229, where the calling ID number is stored.

From step 219, if the "LINE" key 46 is pressed when a call is on hold, then, in step 228, the audio switch 123 is flipped to the other state and the other mode is selected. Thus, if the "LINE" key 46 is pressed when in cellular mode, then wireline mode is selected, and vice versa.

If a call in progress is terminated, such as by the user pressing the "END" key on the keypad 45, or returning the handset 11 to the cradle 14, or by the remote party terminating the call, then in step 231, new calls are enabled.

In step 213, if a call has been on hold for more than a predetermined period of time, such as thirty seconds, control passes to step 234, where a call waiting tone is sounded on the handset 11, to remind the user of the held call.

Figure 7B:
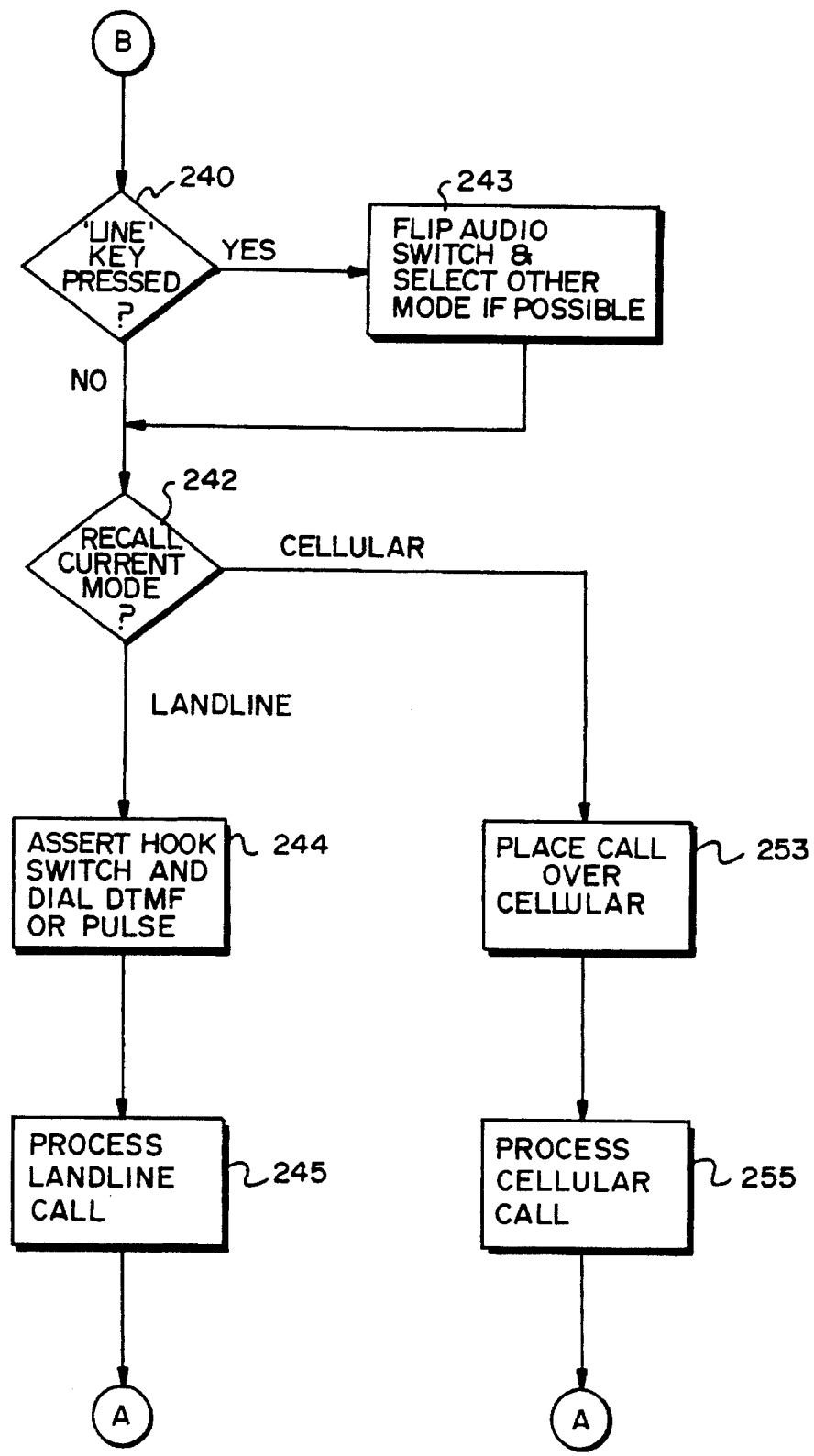

In the event an outgoing call is to be made, in step 216, control passes to a state B, where the flowchart continues in FIG. 7B. Here, in step 240, if the "LINE" key on the keypad is not pressed, then the unit assumes that a wireline outgoing call is to be made, and control passes to step 242 where the audio current mode is recalled. If the user presses the "LINE" key, however, indicating that the outgoing call is to be in the other mode, control passes to step 243, where if the other mode is available, then the audio switch 123 is flipped.

If the current mode, in step 242 is the wireline mode, then control passes to step 244, where the dialed number is retrieved from the handset CPU 116, and the desired wireline call is initiated by the processor 124 asserting the hook switch via line 24-5. The dual-tone multi-frequency (DTMF) digits associated with a normal tone-type wireline 30, are then generated by the signal processor 121, or the processor 124 pulses the hook switch 235 as required for a pulsed wireline 30 depending upon the type of wireline service that is available. In step 245, the processor continues to process the wireline call in the conventional fashion, and control is eventually returned to the idle state A.

If, however, in step 242 the current mode is cellular, the dialed number is retrieved by the processor 124 from the handset CPU 116, and in step 253, the cellular call is initiated in the conventional fashion. (Control is then returned to idle state A.)

Figure 7C:
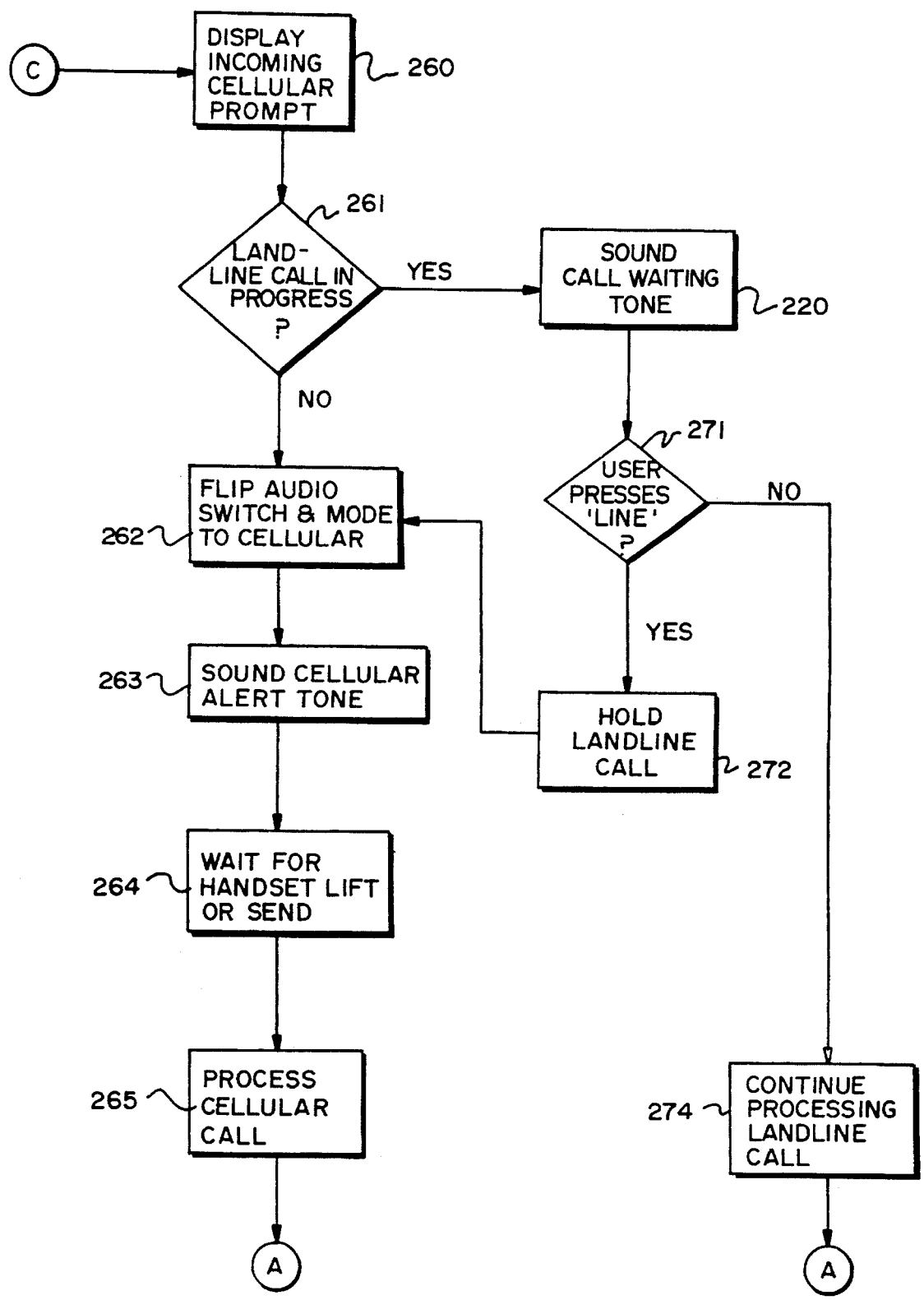

In the event that an incoming cellular call is detected in step 217 (FIG. 7A), control next passes to state C of FIG. 7C.

Here, beginning with step 260, the prompt for an incoming cellular call is initiated such as by flashing the cellular icon 43 (FIG. 3).

In the next step 261, it is determined if a wireline call is in progress. If that is not the case, then control continues with step 262, the audio switch 123 is flipped to the cellular position. Next, in step 263, a cellular alert tone is sounded on the handset 11, to indicate an incoming cellular call. In step 264, the processor 124 then waits for the handset 11 to be lifted or for the user to press the "SEND" key, indicating his desire to answer the incoming call. When either of these occurs, control then continues with step 265, where the cellular call processing is continued in conventional fashion.

If, however, back in step 261, the user did have a wireline call in progress, a call waiting tone is sounded in step 270. After a period of time is allowed to lapse it is determined if the user pressed the "LINE" key on the keypad 45. If indeed this had occurred, it is assumed that the user wishes to pick up the incoming cellular call and hold the wireline call. This is done by performing the appropriate steps to hold the wireline call in step 272, and then continuing, with step 262, to flip the audio switch 123 to the cellular mode, and so forth, finally processing the cellular call in the standard manner in step 265.

If, however, the user does not press the "LINE" key within a predetermined period of time in step 271, control then passes to step 274, where the processor continues handling the wireline call while ignoring the incoming cellular call.

Figure 7D:
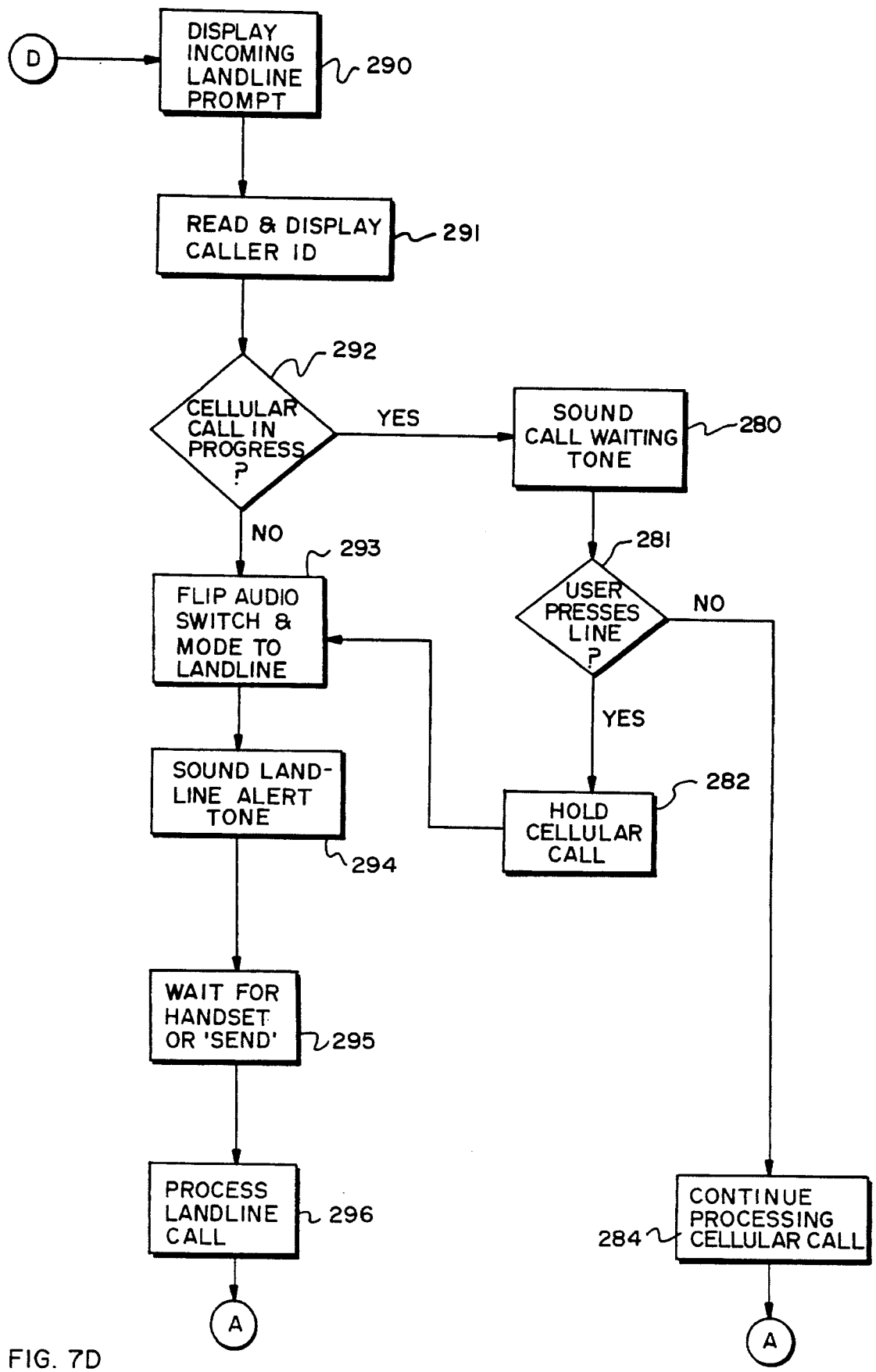

Turning to FIG. 7D, the steps performed by the processor 124 during an incoming wireline call will be described. The first step 290, is to display an incoming wireline prompt such as by flashing the wireline icon 44. The next step 291 is to read any caller ID information which may be available from the wireline 30. If indeed this information is available, then step 291 also presents it to the display on the handset 11.

Step 292 determines if a cellular call is presently in progress. If this is not the case, in step 293, the audio switch 123 is flipped to the wireline position. In step 294, an alert tone is sounded to indicate to the user that a wireline call is incoming, and in step 295, the processor then waits for the user to lift the handset, or press the "SEND" key, indicating a desire to answer the incoming wireline call. Then, in step 296, the wireline call is processed in the usual way.

If, however, in step 292, a cellular call is already in progress, a call waiting tone is sounded in step 280. Control then passes to step 281 where it is determined if the user presses the "LINE" key 46 within a predetermined period of time. If indeed this occurs, in step 282, the cellular call is held and then control passes to step 293, where the audio switch 123 is flipped to the wireline position. The wireline call is then processed in the usual fashion.

Alternately, if in step 281 it was determined that the user did not press the "LINE" key 46 within the predetermined period of time, control then passes to step 284 where processing of the cellular call then continues in the conventional fashion, and the incoming wireline call is ignored.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

As can now be understood, with the wireline interface 20, the cellular telephone 10 can be operated over both cellular and wireline systems. When on the road, the integrated phone works as a conventional cellular telephone to provide the required mobility to call or be reached. When at home or in the office, the telephone can be connected to the wireline network 30 and the user can operate the phone as a full-featured wireline telephone while taking advantage of the low cost wireline service charges.

The arrangement described above, having the dual phone line access, permits the user to send and receive calls via either a cellular or wireline service, which ever fits his needs, and calls can be answered at any a given point in time, using the same subscriber device.

The call waiting features currently available only for wired party lines can be implemented between cellular and wireline calls. For example, when a cellular call comes in during a wireline conversation, the user receives a call waiting tone. The user may then hold the wireline call and switch to take the cellular call or actively switch between cellular and wireline calls.

The user may also elect to forward cellular calls to the wireline service. This is activated when the transceiver processor 12 detects that the wireline interface 20 is present. Thereafter, the user need only pay the wireline service charge for an incoming call.

Calling ID information (provided the user has provided for this service with a local telephone company) is also available via the wireline. The telephone number or even the caller's name of incoming wireline calls is then displayed and/or stored on the user's cellular handset, and the calling ID information can be stored for subsequent cellular calls.

Furthermore, the user need only maintain the same personal information in one place for different communication devices. In particular, the user need only enter, store and maintain an identical set of personal information such as the memory of speed-dial telephone numbers in the handset CPU 116 once. This information is then available, regardless of whether the call is to be placed over the cellular network or the wireline network as stored information and phone numbers can then be supplied for both services.

Finally, certain desirable features such as speed dialing, speaker phone, and alpha-numeric display, that are standard and commonly available on cellular telephones are made accessible to the user when making a wireline call. This is because audio signal selection is handled in the transceiver 12 and therefore all handset functions including the hands-free circuit 115 may be used for both cellular and wireline calls.

What is claimed is:

1. A telephone subscriber unit comprising:

a cellular transceiver for providing cellular audio signals from a wireless telephone network;

a handset for providing handset audio signals;

a wireline interface adapter for providing wireline audio signals from a wireline telephone network;

an audio switch disposed between the cellular transceiver, the handset, and the wireline interface adapter;

means for selectively connecting the cellular audio signals to the handset audio signals during an active cellular telephone call, and for connecting the wireline audio signals to the handset audio signals during an active wireline telephone call;

means for detecting that an active wireline is connected to the wireline interface adapter by detecting the presence of the tip and ring lings of said wireline network; and means for automatically signalling the wireless telephone network to enable call forwarding of calls intended for the cellular transceiver to the active wireline through the wireline network when an active wireline is detected.

2. A telephone subscriber unit as in claim 1 wherein the cellular transceiver, handset, wireline interface, and processor means are enclosed in the same housing as a hand-held portable unit.

3. A telephone subscriber unit as in claim 1 wherein the cellular transceiver, processor means, and handset are packaged as a transportable unit, and the wireline interface adapter is packaged in a separate housing.

4. A telephone subscriber unit as in claim 1 wherein the handset additionally includes a display having a cellular call indicator, and the subscriber unit additionally comprises:

means for detecting an incoming cellular call; and means for activating the cellular call indicator when an incoming cellular call is detected.

5. A telephone subscriber unit as in claim 6 wherein the handset additionally includes a display having a wireline call indicator, and the subscriber unit additionally comprises:

means for detecting an incoming wireline call; and means for activating the wireline call indicator when an incoming wireline call is detected.

6. An apparatus comprising:

cellular transceiver means, for processing cellular telephone calls over a cellular radio network, to provide cellular audio input and cellular audio output signals;

wireline interface means, for processing wireline telephone calls over a land-based telephone network, to provide wireline audio input and output signals;

a handset, for providing handset audio input and handset audio output signals, the handset including a line button;

an audio switch, connected to the cellular transceiver means and the wireline interface means;

an active line detector for detecting when an active wireline is connected to the wireline interface adapter by detecting the presence of the tip and ring lines of said land-based telephone network and providing a signal to the cellular radio network to automatically enable call forwarding of calls intended for the cellular transceiver means to the active wireline through the wireline interface means when an active wireline is detected; and processor means, for operating the audio switch when the line button is operated, to toggle the audio switch to either connect the cellular audio signals to the handset audio signals, or to connect the wireline audio signals to the handset audio signals.

7. A telephone subscriber unit as in claim 6 wherein the cellular transceiver, handset, wireline interface, and processor means are enclosed in the same housing as a hand-held portable unit.

8. A telephone subscriber unit as in claim 6 wherein the cellular transceiver, processor means, and handset are packaged as a transportable unit, and the wireline interface adapter is packaged in a separate housing.

9. A telephone subscriber unit as in claim 6 additionally comprising:

means for answering a cellular call while a wireline call is in progress.

10. A telephone subscriber unit as in claim 6 additionally comprising:

means for answering a wireline call while a cellular call is in progress.

11. A telephone subscriber unit as in claim 6 wherein the handset additionally includes a display having a cellular call indicator, and the subscriber unit additionally comprises:

means for detecting an incoming cellular call; and means for activating the cellular call indicator when an incoming cellular call is detected.

12. A telephone subscriber unit as in claim 6 wherein the handset additionally includes a display having a wireline call indicator, and the subscriber unit additionally comprises:

means for detecting an incoming wireline call; and means for activating the wireline call indicator when an incoming wireline call is detected.

13. A telephone subscriber unit as in claim 6 wherein the handset additionally includes a speaker, and the subscriber unit additionally comprises:

means for detecting an incoming cellular call; and means for sounding a cellular alert tone on the speaker when an incoming cellular call is detected.

14. A telephone subscriber unit as in claim 6 wherein the handset additionally includes a speaker, and the subscriber unit additionally comprises:

means for detecting an incoming wireline call; and means for sounding a wireline alert tone on the speaker when an incoming wireline call is detected.

15. A telephone subscriber unit as in claim 6 wherein the handset additionally includes a speaker, and the subscriber unit additionally comprises:

means for detecting an incoming wireline call; and means for sounding a wireline alert tone on the speaker when an incoming wireline call is detected, the wireline alert tone being different from the cellular alert tone.

16. An apparatus as in claim 6 wherein the wireline interface means additionally comprises a hook switch circuit and hook switch control means, for raising or lower a landline hook switch, and dual tone multi-frequency (DTMF) digit tone generation means, for generating DTMF tones.

17. An apparatus as in claim 6 wherein the handset includes a display having a cellular call indicator and a landline call indicator, additionally comprising:

means for alternately activating the landline call indicator and the cellular call indicator when the line key is alternately depressed; and means for alternately activating the audio switch to alternately connect the cellular audio signals and landline audio signals to the handset when the line key is alternately depressed.

18. A telephone subscriber unit comprising:

a cellular transceiver for providing cellular audio signals from a wireless telephone network;

a handset for providing audio signals;

a wireline interface adapter for providing wireline audio signals from a wireline telephone network;

an audio switch disposed between the cellular transceiver, the handset, and the wireline interface adapter;

means for selectively connecting the cellular audio signals to the handset audio signals during an active cellular telephone call, and for connecting the wireline audio signals to the handset audio signals during an active wireline telephone call;

means for detecting that an active wireline is connected to the wireline interface adapter by detecting the presence of the tip and ring lines of said wireline network;

means for automatically signalling the wireless telephone network to enable call forwarding of calls intended for the cellular transceiver to the active wireline through the wireline network when an active wireline is detected;

means for detecting calling identification information during an incoming wireline call; and means for displaying the incoming caller identification information on a display in the handset during the progress of an incoming wireline call.

\* \* \* \* \*

UNITED STATES PATENT AND TRADEMARK OFFICE
CERTIFICATE OF CORRECTION

PATENT NO. : 5,526,403
DATED : June 11, 1996
INVENTOR(S) : Ambrose W.C. Tam

It is certified that error appears in the above-indentified patent and that said Letters Patent is hereby corrected as shown below:

Column 4, line 10, delete "dose" and insert —close—.
Column 4, line 21, delete "dose" and insert —close—.
Column 10, line 65, delete "lings" and insert —lines.
Column 11, line 18, change "6" to —1—.

Signed and Sealed this

Twenty-ninth Day of October 1996

Attest:

BRUCE LEHMAN

Attesting Officer      Commissioner of Patents and Trademarks